United States Patent [19]

Gray

[11] Patent Number: 4,873,482
[45] Date of Patent: Oct. 10, 1989

[54] SUPERCONDUCTING TRANSMISSION LINE PARTICLE DETECTOR

[75] Inventor: Kenneth E. Gray, Naperville, Ill.

[73] Assignee: The United States of America as represented by the United States Department of Energy, Washington, D.C.

[21] Appl. No.: 225,412

[22] Filed: Jul. 28, 1988

[51] Int. Cl.$^4$ .......................................... G01N 27/00
[52] U.S. Cl. ................................. 324/71.4; 324/71.3; 324/71.6; 250/336.2; 505/866; 505/843
[58] Field of Search .................... 324/71.3, 71.4, 71.6; 333/995; 505/833, 842, 843, 866; 250/251, 336.2; 365/161

[56] References Cited

U.S. PATENT DOCUMENTS 3,691,381 9/1972 Kleppner ........................... 250/336.2
4,037,102 7/1977 Hoyle et al. ........................ 505/833

FOREIGN PATENT DOCUMENTS 102398 3/1984 European Pat. Off. ......... 250/336.2
2377643 9/1978 France ............................... 250/336.2

OTHER PUBLICATIONS

Weiser et al., "Use of Granular Nbn as . . . ;" Journal Appl. Phys.; 52(7); Jul. 1981, pp. 4888–4889.
Crittenden; "Superconducting Thin-Film Detector . . . ;" Jrnl. Appl. Physics, vol. 42, No. 8; Jul. 1971, pp. 3182–3188.

Primary Examiner—Reinhard J. Eisenzopf
Assistant Examiner—Anthony L. Miele
Attorney, Agent, or Firm—Frank J. Kozak; Paul A. Gottlieb; Judson R. Hightower

[57] ABSTRACT

A microvertex particle detector for use in a high energy physic collider including a plurality of parallel superconducting thin film strips separated from a superconducting ground plane by an insulating layer to form a plurality of superconducting waveguides. The microvertex particle detector indicates passage of a charged subatomic particle by measuring a voltage pulse measured across a superconducting waveguide caused by the transition of the superconducting thin film strip from a superconducting to a non-superconducting state in response to the passage of a charged particle. A plurality of superconducting thin film strips in two orthogonal planes plus the slow electromagnetic wave propogating in a superconducting transmission line are used to resolve $N^2$ ambiguity of charged particle events.

12 Claims, 5 Drawing Sheets

SUPERCONDUCTING TRANSMISSION LINE PARTICLE DETECTOR

CONTRACTUAL ORIGIN OF THE INVENTION

The U.S. Government has rights to this invention pursuant to Contract No. W-31-109-ENG-38 between the U.S. Department of Energy and the University of Chicago representing Argonne National Laboratory.

BACKGROUND OF THE INVENTION

In particle colliders used in high energy physics, such as the Superconducting Super Collider (SSC), large solid angle detectors are used to provide data of the trajectories of subatomic particles. The large solid angle detectors can be augmented by including a device for performing high precision tracking close to the bunch crossing point (i.e. within a few tens of centimeters of the point where the beams collide). Such a device is called a microvertex detector. The main purpose of a microvertex detector is to provide "close-in" particle track reconstruction with point-to-point spatial resolution of a few microns. A microvertex detector allows precise location of the primary event vertex, of secondary vertices from decays of c and b quarks or $\tau$leptons, and of vertices unrelated to the event of interest from other beam-beam interactions. In addition, the event vertex constraint and the track segments close to the interaction point improve the overall tracking momentum resolution provided by the large outer tracking chamber.

Several factors impose severe constraints on the design and construction of a microvertex detector to be used at colliders such as the SSC. These factors include the high charged particle multiplicity within events, the requirement for fast detector response arising from the 16 nanosecond bunch spacing, and the high yearly radiation doses a detector would receive near the beam pipe. A microstrip detector made of silicon would be the conventional choice since it would represent proven technology and would adequately address the first two factors mentioned above. With respect to sensitivity to radiation damage, silicon strip detectors are only marginally acceptable for long term operation at a collider such as the SSC. For example, 1 MRad is about the yearly dose expected at 10 centimeters radially away from the interaction point due to minimum ionizing particles from beam-beam interaction. After a 1 MRad dose of radiation, a silicon strip exhibits a greatly increased leakage current. Other more out-of-the-ordinary detectors such as scintillating fibers or semiconductor pixel devices either exhibit some change in their operating characteristics after MRad doses of radiation or have unknown radiation hardness. Therefore, it would be desirable to have a detector that would show no measureable change in its operating characteristics even after several years operation at the SSC.

There exist superconducting materials that are more resistant to damage by radiation by several orders of magnitude compared to semiconductor devices. The present invention utilizes the radiation hardness exhibited by superconducting materials, such as NbN, in order to fabricate a superconducting thin film strip detector sensitive to minimum ionizing particles for use as a microvertex detector.

The idea of using a superconducting film as a particle detector was first proposed approximately 25 years ago by N. K. Sherman in an article entitled "Super-conducting Nuclear Particle Detector" Phys. Rev. Lett. Volume 8, page 438 (1962). The device was envisioned as a detector of fission fragments or alpha particles. Experimental observation of voltage pulses from super-conducting-to-normal (S-N) transitions caused by alpha particles of about 5 MeV kinetic energy incident on thin indium, tin and aluminum films has been reported in D. E. Spiel, R. W. Boom and E. C. Critterdon, Jr., Appl. Phy. Lett. Volume 7, page 292 (1965); E. C. Crittendon, Jr. and D. E. Spiel, J. Appl. Phys. Volume 42, page 3182 (1971); N. Ishihara, R. Arai, T. Kohriki and N. Ujiie, Japan. J. Appl. Phys. Volume 23, page 735 (1984); and K. W. Shephard, W. Y. Lai and J. E. Mercereau, J. Appl. Phys. Volume 46, page 4664 (1975).

The experiments and papers described above were directed at alpha particle detection. More stringent requirements exist for minimum ionizing particles. Also, the above described experiments did not show how to incorporate the thin film strips behavior into a practical device for use as a microvertex detector in collider experiments. In particular, previous experiments did not account for the requirement for accurate readout of data from a thin film strip.

Therefore, it is an object of this invention to provide a microvertex particle detector for use on minimum ionizing particles in a collider which exhibits high precision with respect to particle detection but is resistant to deterioration by radiation.

It is another object of this invention to provide a means for determining the spatial coordinates of particles impinging a superconducting thin film strip particle detector in a short period of time.

It is still a further object of this invention to provide a superconducting thin film particle detector with means for readout of data which overcomes $N^2$ ambiguity.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

This invention is a microvertex particle detector based upon a plurality of parallel superconducting thin film strips separated from a superconducting ground plane by an insulating layer to form a plurality of superconducting waveguides. Specifically, this invention detects the passage of charged particles from collider experiments by observing the transition of a superconducting transmission line from a superconducting state to a nonsuperconducting state by measuring a voltage pulse across the insulating layer by the readout means. In addition, this invention comprises a pair of orthogonal grid systems of these parallel superconducting transmission film strips to observe particle events over a given area.

DETAILED DESCRIPTION OF THE INVENTION

Figure 1:
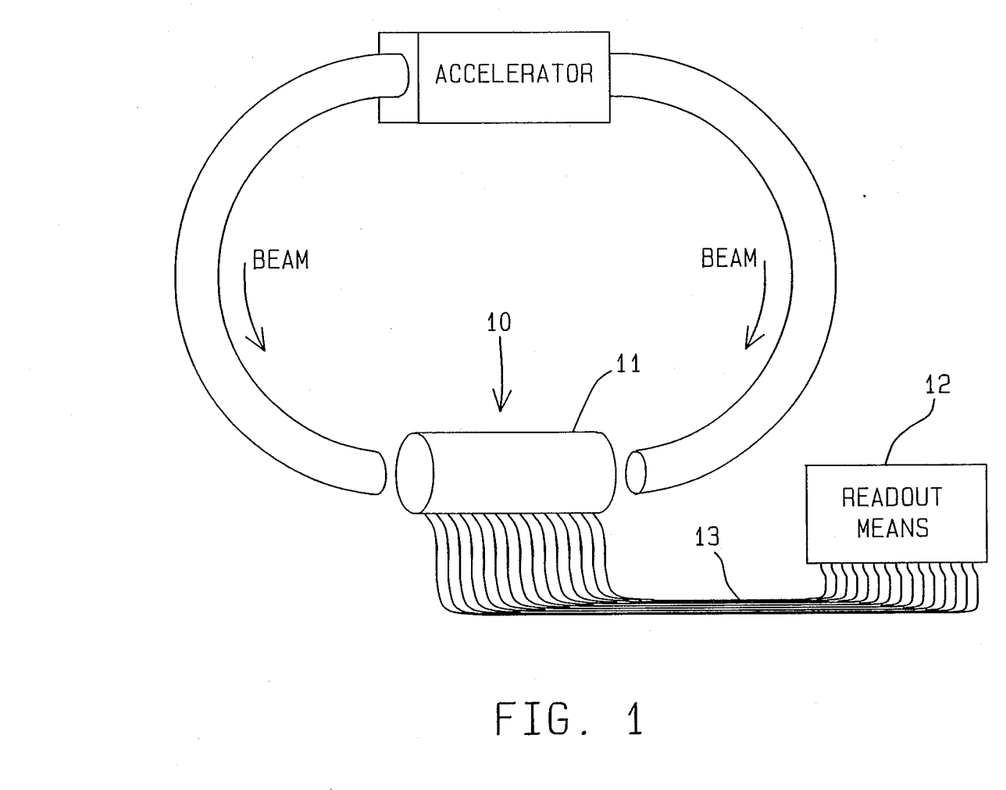
FIG. 1 depicts the present invention with respect to the colliding beams.

Referring to FIG. 1, there is depicted the present invention, the superconducting particle detector 10, in relation to the colliding beams in a high energy physics particle collider, such as the SSC. The superconducting particle detector 10 includes a cylinder shaped body 11 comprised of individual superconducting strips, as described later. As considered for use in a collider such as the SSC, the oppositely moving beams of particles which could be protons, anti-protons, etc., will pass through the cylinder shaped body. Surrounding the superconducting particle detector 10 there will normally be other particle detectors (not shown in FIG. 1). In operation, the particles are accelerated to high speeds in opposite directions in an elliptical ring and directed at each other so that collision between some oppositely moving protons occurs inside the detector. The design of the SSC allows collisions between protons at energies of 40 trillion electron volts. A collision produces subatomic particles which can be studied by physicists. The size, trajectory, and speed of the paths of these particles can reveal properties of the subatomic particles.

The detector body 11 of the present invention may be approximately 4" in diameter and 8" long. The detector body 11 is wired to a readout means 12 by a plurality of wires 13, as described later. The readout means 12 is located a distance away from the colliding beams so as to avoid interference from the collisions.

In principle the superconducting thin film strip of the present invention reacts to the heat disipated by the passage of a particle. A superconducting thin film strip carries a current bias which is nearly critical, i.e. just below the level of transition between superconducting and non-superconducting states (S-N). Ionization from the passage of a charged particle through the strip serves to heat the region around the particle path above its critical temperature. The resulting S-N transition propagates across the width of the strip and the resistive region thus created produces a detectable voltage pulse.

Figure 2:
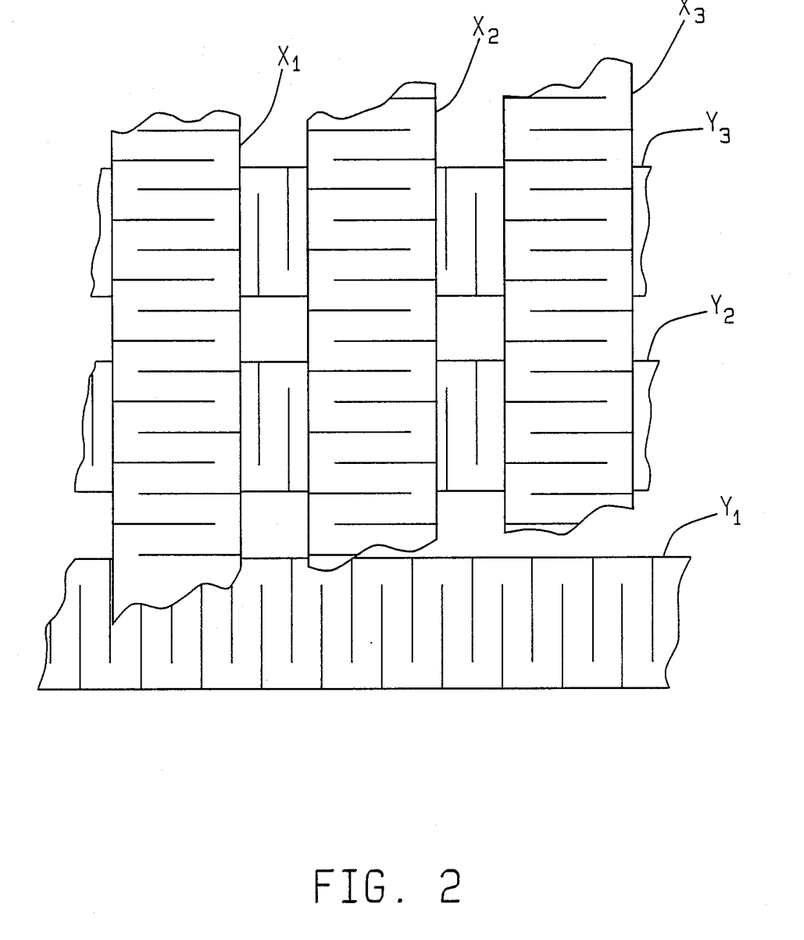
FIG. 2 depicts the perpendicular arrangement of thin film strips in two planes.

The detector body 11 is comprised of a plurality of such superconducting strips. These strips are arranged in two separate concentric cylinders. The strips in each cylinder are parallel to each other but orthogonally arranged with respect to the strips in the other cylinder. Referring to FIG. 2, there is depicted a section of the detector body 10 with a representation of the orthogonal arrangement of superconducting strips. In FIG. 2, there is a first cylindrical arrangement of suprconducting strips, $x_1, x_2 \ldots x_n$. A second cylindrical arrangement of parallel superconducting strips, $y_i, y_2 \ldots Y_n$ lies in a plane above the first arrangement of superconducting strips $X_1 \ldots X_n$. Because these superconducting strips are in the cylindrical detector body 11, one of these arrangements of strips will be cylindrically concentric with the other. Each strip occupies an area approximately 10–50 microns wide. Therefore, for an 8" long detector body there are approximately $5-25 \times 10^4$ parallel strips in each of these concentric cylinders.

Figure 3:
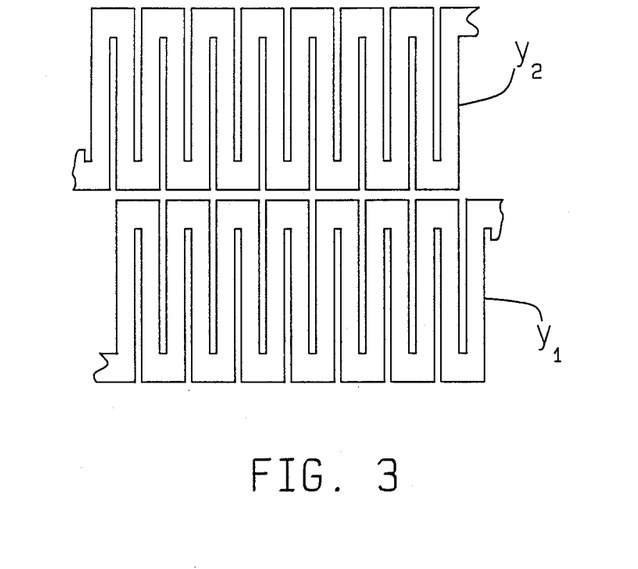
FIG. 3 depicts the shape of the two adjacent parallel thin film strips.

Although each strip occupies an area approximately 10–50 microns wide, the strip itself is only 1–2 microns wide. This is because each strip $y_1, \ldots y_n$ is shaped in a zigzag pattern as depicted in FIG. 3. Approximately 0.2 microns separate the strips. The strips $x_1 \ldots x_n$ in the other cylindrical arrangement of strips are similarly constructed except the strips are arranged in an orthogonal direction to the strips in the first cylindrical arrangement. The purpose of the zigzag pattern is to maintain the individual strip width to 1–2 microns, for reasons to be explained later. The zigzag pattern also serves to decrease the number of parallel strips and increase the length of each strip consistent with design and materials constraints.

Figure 4:
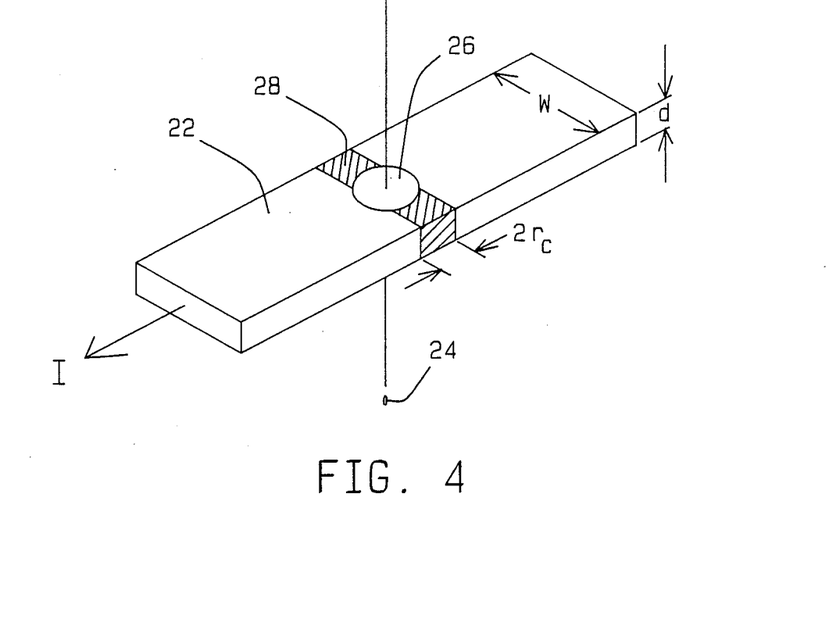
FIG. 4 is a perspective drawing of a section of the thin film superconducting strip with a particle depicted just having passed through it.

Referring to FIG. 4, there is depicted a portion of the thin film strip 22 of the present invention. Strip 22 is connected to a current source (not shown in this drawing) which supplies a current pulse, I, in strip 22. The portion of thin film strip 22 has a width w and thickness d and carries the current I, which is close to but below, the critical current, $I_c(T_b)$, where $T_b$ is the bath or substrate temperature at which strip 22 is maintained. A charged subatomic particle 24, such as produced in a collider experiment, passes through strip 22. The energy loss by incident particle 24 produces a local heating in the cylindrical region 26 centered on the particle trajectory. The cylindrical region 26 has a radius $r_c$. Within radius $r_c$, which is determined by the strip material's specific heat and the deposited energy from the particle 24, the temperature rises above its critical value forcing the current into the areas 28 between this region and the filmstrip edges. This reduces the effective width by $2r_c$, thereby decreasing the critical current proportionately:

$$I_c'(T_b) = I_c(T_b)[w - 2r_c]/w. \quad (1)$$

The current bias I is set to be greater than this reduced value, $I_c'(T_b)$, so that the whole cross-section of the film becomes normal conducting. Because the uniformities of w, d and $I_c(T_b)$ are limited by practical considerations, w cannot be too much larger than $2r_c$.

The normal radius, $r_c$, can be estimated from the molar enthalpy change, $\Delta h$, of the superconducting material in going from $T_b$ to its critical temperature $T_x$. Assuming that the ionization heating is uniform and confined to the normal region, the result is $$r_c = \sqrt{(dE/dx)/\pi \Delta h} \quad (2)$$

where $dE/dx$ is the energy loss per unit distance for the particle. Thus, a small value of the specific enthalpy is highly desirable. For example, the very large specific heat near 100 Kelvin of the high-$T_c$ oxide superconductors would not indicate their use here since the normal region created by minimum ionizing particles would be negligibly small. The film widths used in the earlier work by Spiel, et al. ranged from 5 to 50 microns and the region heated above the critical temperature had a radius of 2.5 to 9 microns around the trajectory of the alpha particles. Spiel, et al. showed that the radius of the normal region agreed well with estimates given by a heat diffusion model. Since 5 MeV alpha particles deposit approximately 200 times the energy of minimum ionizing particles, these data and Equation 2 imply that high energy particles would produce a normal region of a few tenths microns in radius.

The normal region will have an initial length along the strip of about $2r_c$ so that the instantaneous potential drop, assuming I is constant, is given by $$V = 2r_c\rho i \leq 2r_c\rho J_c \quad (3)$$

where $\rho$ is the normal state residual resistivity of the strip material and $J=I/dw$ is the current density. This voltage pulse can be observed across an external resistor and is close to the unattainable limit given when $J=J_c$ for the reasons given after Equation 1. The normal region thus created can either collapse or propagate depending on whether the Joule heating in the region exceeds the cooling capacity of the substrate and/or bath. Spiel, et al. observed both modes in their work with alpha particles. In the case where the normal region collapsed and the strip recovered its superconductivity, pulses of 10 nanoseconds risetime and 70 nanoseconds decay were observed. For use as a fast recovering detector for high multiplicity of events, operation in the collapsing mode would be preferable. For the present case of minimum ionizing particles with smaller energy loss this should be the easier of the operating modes and one might also expect the signal decay time to be shorter. The reasoning is that alpha particles deposit significantly more energy in the substrate of the strip than in the sample since $dE/dx$ is steeply rising at this kinetic energy. The energy deposited in the substrate also contributes to heating of the strip. For minimum ionizing particles, $dE/dx$ is essentially uniform throughout, and little additional heating of the strip can be expected.

The feasibility for detecting minimum ionizing particles then requires obtaining a value of V that is sufficiently above the noise level and a value of $r_c$ that is large enough that film widths, which can be no wider than a few times $r_c$, can be made reliably and uniformly over the relatively large detector areas envisioned. As can be seen from Equation 2 and 3, these depend on materials properties of the superconductor, i.e. $\rho$, $J_c$ and $\Delta h$. An additional requirement of radiation hardness for a practical detector leads to consideration of NbN as a suitable material. The properties of NbN are relatively well known. In a NbN thin film strip, $J_c$ exceeds $10^6$ A/cm$^2$ for zero field and is above $2\times 10^5$ A/cm$^2$ for fields of 10 T. Superconductivity persists to fields above 20 T. High values of $\rho$ ($>200$ micro-ohms/centimeter) are routinely found in sputtered films due to the granular microstructure and high concentration of defects. Studies of NbN irradiated with fast neutrons ($>1$ MeV) have observed only a 1% change in $T_c$ for doses up to $10^{19}$ neutrons/cm$^2$. The dependence of $J_c$ on neutron irradiation has also been measured. For this, samples of NbN were irradiated at room temperature by neutrons of energy greater than 0.1 MeV at a test reactor at the Oak Ridge National Laboratory. The $J_c$ at 4.2 Kelvin in a 10 T field was measured before and after irradiation and no change was observed, within the measuring error up to a fluence of $2.5\times 10^{17}$ neutrons/cm$^2$. For twice this dose, which corresponds to at least 100 MRads, a decrease of about 10% was observed in most samples.

The largest values for $\rho$ and $J_c$ are highly desirable but also $r_c$ which comes from Equation 2. For minimum ionizing particles, $dE/dx$ varies roughly with the mass density so that differences between various superconducting materials will be small. However $\Delta h$ will depend on the specific heat and the critical temperature $T_x$ under the operating conditions of the device. Large values of $T_x$ imply large $\Delta h$ and hence small values of $r_c$. An estimation of $T_x$ comes from the measured $dJ_c/dT$ of the material and by using $$T_x = T_b + \epsilon[J_c/(dJ_c/dT)]T_b \quad (4)$$

where $\epsilon = 1 - J/J_c$. For NbN, typical values of $[J_c/(dJ_c/dT)]T_b$ are 10 to 15 Kelvin for $T_b = 4.2$ Kelvin and about 5 Kelvin for $T_b = 8$ Kelvin. In the latter case, $J_c$ is 60% smaller than at 4.2 Kelvin. Thus, choosing a superconductor with $T_c$ (at zero current and field) much greater than $T_b$ gives almost the maximum value of $J_c$ for the material, which increases V through Equation 3, but may result in a small value of $dJ_c/dT$ leading to large $T_x$. Because of the strong dependence of $r_c$ on $T_x$, through $\Delta h$, this is disadvantageous. Therefore, $T_c$ values closer to $T_b = 4.2$ Kelvin than the 16 Kelvin of NbN may be desirable. If lower $T_c$ is desired to reduce $T_x$, the compounds $Nb_{1-x}V_xN$ seem promising since these may maintain the high values of and $J_c$ found in NbN. For $x=0$, $T_c$ is about 16 Kelvin, but it decreases to about 3.5 Kelvin for $x=0.4$ and then rises to 9 Kelvin for $x=1$.

Using the measured specific heat of NbN and anticipated values of $T_x$ approximately equal to 6.2 Kelvin, based on $\epsilon = 0.2$ and $[J_c/(dJ_c/dT)]T_b = 10$ Kelvin, one finds $r_c$ approximately equal 0.2 microns and that w must be of order 2 microns in order to achieve switching from minimum ionizing particles. Then, if $\rho = 200$ micro-ohm-centimeter and $J_c = 2\times 10^5$ A/cm$^2$ one finds $V = 1.6$ mV from Equation 3, and this is comparable to values found in wire chambers.

The above described physical properties of the NbN-type superconductors establish certain parameters for the readout electronics used with the thin film strips in the present invention. As described above, a measurable energy loss for minimum ionizing particles requires strip widths of 1–2 microns. This is required in order that the initially created normal region is a sufficient fraction of the width that the current density is increased above the critical value in the remaining, superconducting portion of the strip. Such strips can be fabricated, but it is improbable that a detector composed of many parallel strips of this width could be made, or would even be desirable given the enormous number of channels it would contain. Resolution which is 5 times better than silicon microstrip detectors can be achieved, for example, by fabricating 1–2 micron wide strips where each strip forms a zigzag pattern having a width of 10–50 microns and several centimeters in length as depicted in FIG. 3. The number of channels and the problem of connecting them to the readout electronics would be similar to that for a silicon device.

The arrival time of the voltage pulse from the S-N transition contains information on the position of the particle interaction along the strip. However, if this information travels with the speed of light in vacuum, the desired spatial resolution of 10 microns places impractical limits on the time resolution. However, the phase velocity of electromagnetic waves propagating in superconducting thin film waveguides has been shown to be considerably less than the free space value of $c=3\times 10^8$ meter/second. The explanation is based on the different penetration depths of electric and magnetic fields into superconductors. While the magnetic field can penetrate a depth of 50 to 500 nanometers into the superconductors forming the waveguide, electric fields are strictly excluded from the superconductors and are confined to the insulator region between the superconductors which can be only 1-2 nanometers. The phase velocity depends roughly on the square root of this ratio and can be as low as 0.012c in Josephson junctions assuming a dielectric constant of 10 of the insulator region. Thus, the present invention employs this phenomena using a superconducting waveguide comprised of the thin film strip detector with a superconducting ground plane separated by a thin insulating layer.

Figure 5:
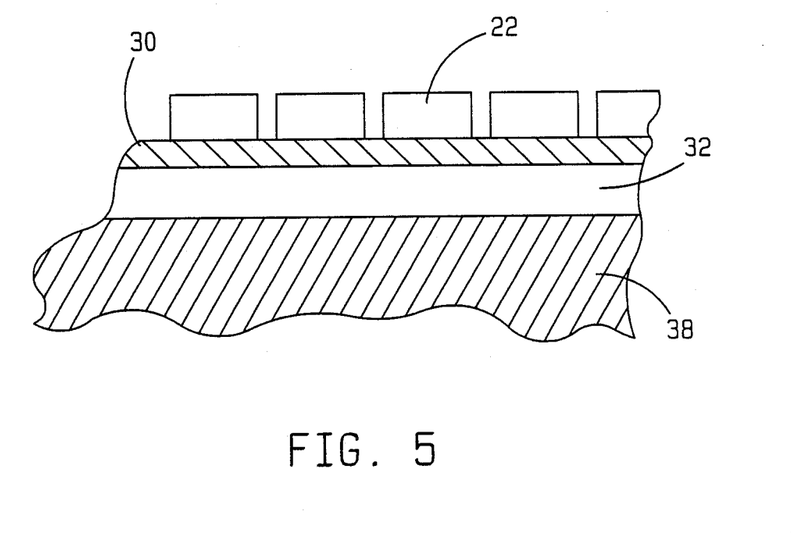
FIG. 5 depicts a perpendicular cross-section of a multiplicity thin film strip as applied to a substrate base.

Referring to FIG. 5, there is depicted an arrangement for construction of such a superconducting waveguide. The superconducting waveguide is comprised of a superconducting film strip 22 separated from a superconducting ground plane 32 by an insulating layer 30. The waveguide is supported on a substrate 38. The waveguide can be constructed by sputtering the NbN ground plane on a sapphire substrate. The NbN ground plane can have a thickness of 1 micron. The insulating layer 30 can be made by exposing the NbN to a wet chemical anodic oxidation, thereby forming an oxide layer which will be the insulating layer. The insulating layer made of the oxide can be on the order of 50 angstrom units in thickness. The plurality of superconducting film strips, such as superconducting film strip 22 can then be formed on the insulating layer 30 by first creating a strip mask on the top of the oxide layer using photolithography and then reactively sputtering on the thin film strip. The thin film strip can be a 1 micron thick layer of $Nb_{0.85}V_{0.15}N$. The plurality of thin film strips are adjacent each other on the insulating layer 30 and superconducting ground plane 32.

In operation, the readout from the superconducting thin film strip relies on the relatively slow propogation of the electromagnetic wave pulse in the insulating portion (i.e. the criteria of the superconducting waveguide) caused by the S-N "hot spot" in the thin film layer as a result of the transition due to charged particle. The propagation speed is given by $$c = c\sqrt{\frac{\delta}{2\epsilon\lambda}} \quad (5)$$

where $\lambda$ is the magnetic field penetration depth, $\delta$ is the insulating layer thickness, and $\epsilon$ is the relative dielectric contsant. For a 1 micron strip, 50 angstrom insulating layer, and a typical oxide dielectric constant of 10, the propagation speed is reduced by almost factor of 100 from the speed of light.

Figure 6:
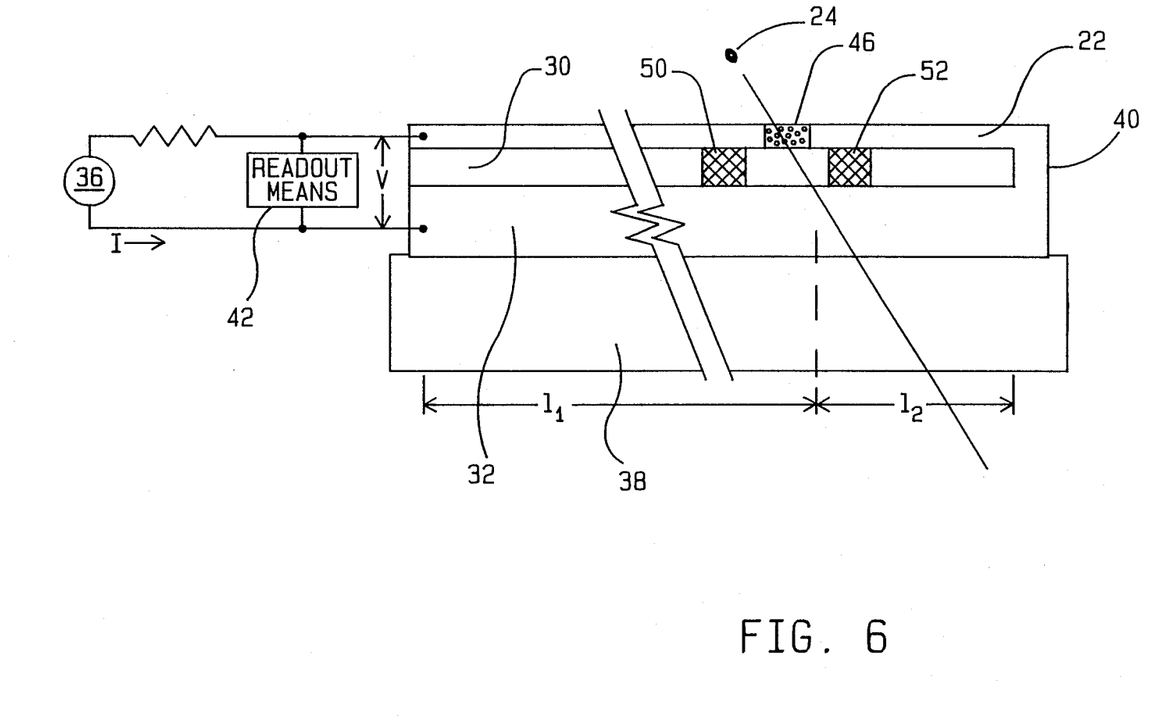
FIG. 6 depicts a cross-section of the superconducting transmission line waveguide.

Referring to FIG. 6, a superconducting transmission line waveguide is formed as in accordance with the previous description. A waveguide is energized by a current, I, supplied by a current source 36. The current may be on the order of 1 ma. The thin film strip 22 and ground plane 32 are connected at terminal end 40 to form a circuit for carrying current, I. FIG. 6 shows "hot spot" region 46 in strip 22 as a result of the passage of particle 24. Voltage pulses 50 and 52 result across the waveguide.

The method to localize the particle track along the film's length relies on the time of flight of the relatively slow velocity of electromagnetic waves achievable in superconducting transmission line structures. The slow velocity results from the large penetration of the magnetic field into the superconductor, as compared to the electric field which is confined to the insulator. The location of the particle's passage through the thin film strip is determined by measuring the direct voltage pulse, V, across the superconducting waveguide at readout means 42. The time difference measured at readout means 42 between the arrival of the direct voltage pulse 50 (delay proportional to $l_1$) and the pulse 52 reflected from the far end 40 of the film 22 (delay proportional to $l_1+2\ l_2$) can be used to determine the position of particle track passage. A 1 millimeter spatial resolution can be achieved with 0.3 nanosecond time resolution. The voltage pulse V, measured across each of the superconducting transmission line waveguides is approximately 4 mV. In this configuration, good heat removal causes the hot spot 46 to collapse.

To achieve finer spatial resolution, a second arrangement of parallel thin film strips at right angles to the first, is used. This is the pair of concentric cylindrical arrangements of strips, depicted in FIG. 3. The 1 millimeter resolution of the electromagnetic wave is only used to approximately localize events and overcome the problem of $N^2$ ambiguity.

$N^2$ ambiguity results from N signals on both x and y channels leading to $N^2$ possible distributions. This invention uses two cylindrical planes of thin film strips formed to produce a multiplicity of orthogonally-oriented superconducting transmission line waveguide detectors. The strips of the two cylindrical planes are at right angles to each other. The strip-to-strip spatial resolution is 10 microns, but using the above estimates, one finds a spatial resolution along the strip length to be 2 millimeters for an electronic time resolution of 1 nanosecond. Although this is inferior to conventional detectors, it is sufficient to unravel the $N^2$ problem if the two detector assemblies are placed at right angles with one above the other. Simply stated, with a multiplicity of N events per bunch, the 2 millimeters resolution along the strip is sufficient to identify which events in the two detectors assemblies correspond to the same particle track, and thus provide spatial resolution of 10 microns in each orthogonal direction. With this information, it is possible to identify which of the N events in each detector correspond to the same particle.

Although this invention is described as particularly adapted for use in a particle collider for high energy physics experiments, this invention has potential utility in other applications requiring the detection of particle transmission. Such applications include x-ray detection in advanced weapons systems, astronomy, imaging, and spectrometry. Appropriate modification and adaptation of the present invention would likely be required for such applications.

The embodiments of the invention in which an exclusive property or privilege is claimed are defined as follows:

1. A microvertex detector for tracking charged subatomic particles comprising:
a plurality of superconducting transmission line waveguides positioned to be capable of intercepting the trajectory of a moving subatomic particle, said plurality superconducting transmission line waveguides capable of carrying current supplied by a current source and
readout means responsive to said plurality superconducting transmission line waveguides whereby the position of a particle passing through any of said plurality of superconducting transmission line waveguides can be determined.

2. The detector of claim 1 in which each superconducting transmission line waveguide of said plurality of superconducting transmission line waveguides is comprised of
   a superconducting ground plane coupled at one end to said readout means,
   an insulating layer adjacent to said superconducting ground plane,
   a superconducting thin film strip parallel to said superconducting ground strip plane and separated from said superconducting ground plane by said insulating layer thereby forming a superconducting waveguide, said superconducting thin film strip connected at one end to said readout means and at the other end across said insulating layer to said superconducting ground plane.

3. The detector of claim 2 in which said plurality of superconducting transmission line waveguides is comprised of:
   a first arrangement of parallel superconducting transmission line waveguides, and
   a second arrangement of parallel superconducting transmission line waveguides, said second arrangement of parallel superconducting transmission line waveguides at an angle to said first arrangement of parallel superconducting transmission line waveguides.

4. The detector of claim 3 in which said plurality of superconducting transmission line waveguides is shaped like a cylinder and positioned so that collisions of particles can occur inside the cylinder.

5. The detector of claim 4 in which said first and said second arrangements of parallel superconducting transmission line waveguides are shaped like cylinders and are concentric.

6. The detector of claim 5 in which said superconducting thin film strips are composed of NbN.

7. The detector of claim 6 in which each of said thin film strips is approximately 2 microns in width.

8. The detector of claim 7 in which each of said thin film strips forms a zig-zag pattern 10–50 microns wide.

9. The detector of claim 8 including a substrate on which said superconducting ground plane is based.

10. The detector of claim 9 in which each of said superconducting thin film strips is separated from an adjacent superconducting thin film strip by approximately 0.2 microns.

11. The detector of claim 10 in which said superconducting thin film strips are maintained at a temperature between 4 and 8 degrees Kelvin.

12. A method for tracking particles in a high energy physics particle detector comprising the steps of:
   maintaining a plurality of parallel superconducting waveguides at a location close to the vertex of the particle collisions;
   maintaining a current in said plurality of parallel superconducting waveguides so that passage of a particle through said plurality of superconducting waveguides causes a portion of said plurality of superconducting waveguides to become nonsuperconducting;
   measuring a voltage pulse caused by the non-superconducting portion of said plurality of superconducting strips;
   whereby the location of passage of a particle can be determined.

* * * * *